(12) United States Patent
Kim et al.

(10) Patent No.: US 8,811,503 B2
(45) Date of Patent: Aug. 19, 2014

(54) SYSTEM FOR GENERATING SPACE FREQUENCY BLOCK CODE RELAY SIGNAL AND METHOD THEREOF

(75) Inventors: Young-Doo Kim, Seoul (KR); Eung Sun Kim, Suwon-si (KR); Chang Yong Shin, Seoul (KR); Gi Hong Im, Pohang-si (KR); Jong Bu Lim, Pohang-si (KR); Tae-Won Yune, Pohang-si (KR)

(73) Assignees: Samsung Electronics Co., Ltd., Suwon-si (KR); Postech Academy-Industry Foundation, Pohang-si (KR)

( * ) Notice: Subject to any disclaimer, the term of this patent is extended or adjusted under 35 U.S.C. 154(b) by 1223 days.

(21) Appl. No.: 12/032,714

(22) Filed: Feb. 18, 2008

(65) Prior Publication Data
US 2009/0103428 A1   Apr. 23, 2009

(30) Foreign Application Priority Data
Oct. 18, 2007 (KR) .......... 10-2007-0105265

(51) Int. Cl.
| | |
|---|---|
| H04L 27/28 | (2006.01) |
| H04L 5/00 | (2006.01) |
| H04L 27/26 | (2006.01) |
| H04L 25/20 | (2006.01) |
| H04B 7/155 | (2006.01) |
| H04L 1/06 | (2006.01) |
| H04L 1/00 | (2006.01) |

(52) U.S. Cl.
CPC ............ H04L 25/20 (2013.01); H04L 5/0026 (2013.01); H04L 27/2647 (2013.01); H04L 1/0643 (2013.01); H04L 1/0606 (2013.01); H04L 1/005 (2013.01); H04L 2001/0097 (2013.01); H04L 1/0625 (2013.01); H04L 27/2626 (2013.01); H04B 7/15592 (2013.01); H04L 1/0631 (2013.01)
USPC .......... 375/260; 375/267; 375/299; 375/347; 370/208; 370/210

(58) Field of Classification Search
USPC .......... 375/260, 267, 299; 370/210, 321, 315
See application file for complete search history.

(56) References Cited

U.S. PATENT DOCUMENTS

| | | | |
|---|---|---|---|
| 2004/0022183 A1* | 2/2004 | Li et al. ........................ | 370/210 |
| 2006/0105709 A1* | 5/2006 | Oh et al. ...................... | 455/13.1 |

(Continued)

FOREIGN PATENT DOCUMENTS

| | | |
|---|---|---|
| KR | 10-20060057471 | 5/2006 |
| KR | 10-20070004370 | 1/2007 |

OTHER PUBLICATIONS

Kaiser, S.; , "Space frequency block codes and code division multiplexing in OFDM systems," Global Telecommunications Conference, 2003. GLOBECOM '03. IEEE, pp. 2360-2364 vol. 4, Dec. 1-5, 2003.*

(Continued)

Primary Examiner — Daniel Washburn
Assistant Examiner — Eboni Hughes
(74) Attorney, Agent, or Firm — NSIP Law

(57) ABSTRACT

A method and system for generating a space frequency block code relay signal includes a signal detection unit which detects a received signal by receiving a first and second source signals transmitted from a first and second source nodes, a relay signal generation unit which generates a relay signal cooperating with the first and second source signals using a space frequency block code (SFBC) scheme based on the received signal, and a signal transmitter which transmits the relay signal to a destination node.

21 Claims, 7 Drawing Sheets

(56) References Cited

U.S. PATENT DOCUMENTS

| | | | |
|---|---|---|---|
| 2006/0270363 A1 | 11/2006 | Sandhu et al. | |
| 2007/0070954 A1 | 3/2007 | Kim et al. | |
| 2007/0129008 A1* | 6/2007 | Shi et al. | 455/11.1 |
| 2007/0189151 A1* | 8/2007 | Pan et al. | 370/210 |
| 2008/0025248 A1* | 1/2008 | Naden | 370/321 |
| 2008/0279301 A1* | 11/2008 | Khan et al. | 375/267 |
| 2009/0022242 A1* | 1/2009 | Waters et al. | 375/299 |
| 2009/0103472 A1* | 4/2009 | Ni et al. | 370/315 |
| 2009/0220023 A1* | 9/2009 | Ihm et al. | 375/267 |
| 2010/0150210 A1* | 6/2010 | Zhao et al. | 375/141 |

OTHER PUBLICATIONS

Oh-Soon Shin; Chan, A.M.; Kung, H.T.; Tarokh, V.; , "Design of an OFDM Cooperative Space-Time Diversity System," Vehicular Technology, IEEE Transactions on , vol. 56, No. 4, pp. 2203-2215, Jul. 2007.*

Younis, W.M.; Sayed, A.H.; Al-Dhahir, N.; , "Efficient adaptive receivers for joint equalization and interference cancellation in multiuser space-time block-coded systems," Signal Processing, IEEE Transactions on , vol. 51, No. 11, pp. 2849-2862, Nov. 2003.*

Yilmaz, A. Ozgur. "Cooperative Multiple-Access in Fading Relay Channels," Communications, 2006. ICC '06. IEEE International Conference on , vol. 10, pp. 4532-4537, Jun. 2006.*

Kaiser, S. "Space frequency block codes and code division multiplexing in OFDM systems," Global Telecommunications Conference, 2003. GLOBECOM '03. IEEE, vol. 4, pp. 2360-2364 vol. 4, Dec. 1-5, 2003.*

Korean Office Action issued May 22, 2013 in counterpart Korean Application No. 10-2007-0105265 (5 pages, in Korean).

Zhou, et al. "Space-frequency coded cooperative scheme among distributed nodes in cognitive UWB radio." Personal, Indoor and Mobile Radio Communications, 2005. PIMRC 2005. IEEE 16th International Symposium on. vol. 1. IEEE, 2005: 461-465.

* cited by examiner

SYSTEM FOR GENERATING SPACE FREQUENCY BLOCK CODE RELAY SIGNAL AND METHOD THEREOF

CROSS-REFERENCE TO RELATED APPLICATION

This application claims priority from Korean Patent Application No. 10-2007-0105265, filed on Oct. 18, 2007, in the Korean Intellectual Property Office, the entire disclosure of which is incorporated herein by reference.

TECHNICAL FIELD

The following description relates to a system for generating a space frequency block code relay signal in cooperation with a source node, and a method using the system.

BACKGROUND

Low cost technologies for providing Internet services regardless of location and time are sought by Internet users and service enterprisers. One scheme for realizing a high speed data transmission rate for mobile Internet users is an Orthogonal Frequency Division Multiplexing (OFDM) scheme.

While OFDM signals are transmitted without being significantly affected by a frequency-selective fading, OFDM schemes still face various known problems. Accordingly, a communication technology using a multi-antenna has attracted a great deal of attention as one of the technologies for solving the problems of the OFDM scheme.

Since a receiver receiving signals by radio has limitations in terms of its volume, area, and power consumption, a multi-antenna is generally equipped in a transmitter. By equipping a plurality of antennas in the transmitter, it is possible to reduce the complexity of the receiver, and to minimize the performance drop due to a multi-path fading.

However, when a user's mobile terminal is a transmitter, including, but not limited to, a portable or hand-held terminal, it is difficult to equip the mobile terminal with multiple antennas. To acquire a transmission (TX) diversity effect, the size of a mobile terminal may be increased to provide sufficient distance between the plurality of antennas.

Accordingly, there is a need for a system for generating a space frequency block code relay signal and a method using the system which realizes a high speed data transmission rate and increases frequency performance, while meeting the demand for a compact transmitter including a user's mobile terminal.

SUMMARY

According to one general aspect, a system for generating a space frequency block code relay signal includes: a signal detection unit which detects a received signal by receiving first and second source signals transmitted from first and second source nodes; a relay signal generation unit which generates a relay signal according to the received signal, wherein the relay signal is generated based on the first and second source signals using a space frequency block code (SFBC) scheme; and a signal transmitter which transmits the relay signal to a destination node.

According to another aspect, a method of generating a space frequency block code relay signal includes: receiving first and second source signals transmitted from first and second source nodes to detect a received signal; generating a relay signal according to the received signal, wherein the relay signal is based on the first and second source signals using a space frequency block code (SFBC) scheme; and transmitting the relay signal to a destination node.

The system and method of generating the space frequency block code relay signal according to an exemplary embodiment may improve performance of a frequency by generating the space frequency block code relay signal utilizing first and second source signals generated by first and second source nodes.

The system and method of generating the space frequency block code relay signal according to an exemplary embodiment may effectively generate a relay signal with fewer operations by generating the relay signal in a time domain.

According to still another aspect, a system for receiving a space frequency block code relay signal includes: a signal detection unit which receives first and second source signals transmitted from first and second source nodes and a relay signal transmitted from a relay node, and detects a received signal in a frequency domain, the relay signal being generated using a space frequency block code (SFBC) scheme based on the first and second source signals; an interference cancellation unit which cancels an interference signal due to another source node in the received signal for each of the first and second source nodes, and generates first and second interference cancellation source signals; and a frequency domain equalizer (FDE) which generates first and second compensation source signals by compensating for the first and second interference cancellation source signals. The interference cancellation unit may cancel the interference occurring due to the other source node utilizing the first and second compensation source signals, and update the first and second interference cancellation source signals.

According to yet another aspect, a method of receiving a space frequency block code relay signal includes: receiving first and second source signals transmitted from first and second source nodes and a relay signal transmitted from a relay node, and detecting a received signal in a frequency domain, the relay signal being generated using a space frequency block code (SFBC) scheme based on the first and second source signals; canceling an interference signal due to another source node in the received signal for each of the first and second source nodes, and generating first and second interference cancellation source signals; and generating first and second compensation source signals by compensating for the first and second interference cancellation source signals.

According to still yet another aspect, a system for generating a relay signal includes: a signal detection unit which receives first and second source signals from first and second source nodes; and a relay signal generation unit which generates the relay signal using a space frequency block code (SFBC) scheme based on the first and second source signals. The relay signal may be a signal encoded by the SFBC scheme.

According to still a further aspect, a system for generating a space frequency block code relay signal includes: a cyclic prefix cancellation unit which cancels a cyclic prefix of first and second source signals; an energy normalization unit which normalizes a received signal corresponding to the first and second source signals; a serial to parallel converter which separates the received signal normalized to a unit energy signal in a time domain; a discrete Fourier transformer (DFT) which converts the separated unit energy signal into a frequency domain received signal; an encoding unit comprising a conjugate unit and an order exchange unit which encodes the frequency domain received signal; an inverse discrete Fourier transformer (IDFT) which converts a relay signal in a frequency domain into a signal in a time domain; a parallel to serial converter which integrates the converted signal in the time domain to generate a relay signal in the time domain; and a cyclic prefix adder which adds a cyclic prefix to the replay signal in the time domain, wherein the relay signal is an encoded signal based on the first and second source signals using a space frequency block code (SFBC) scheme.

The system and method of receiving the space frequency block code signal may effectively detect the space frequency block code signal while improving the frequency performance.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION

Figure 1:
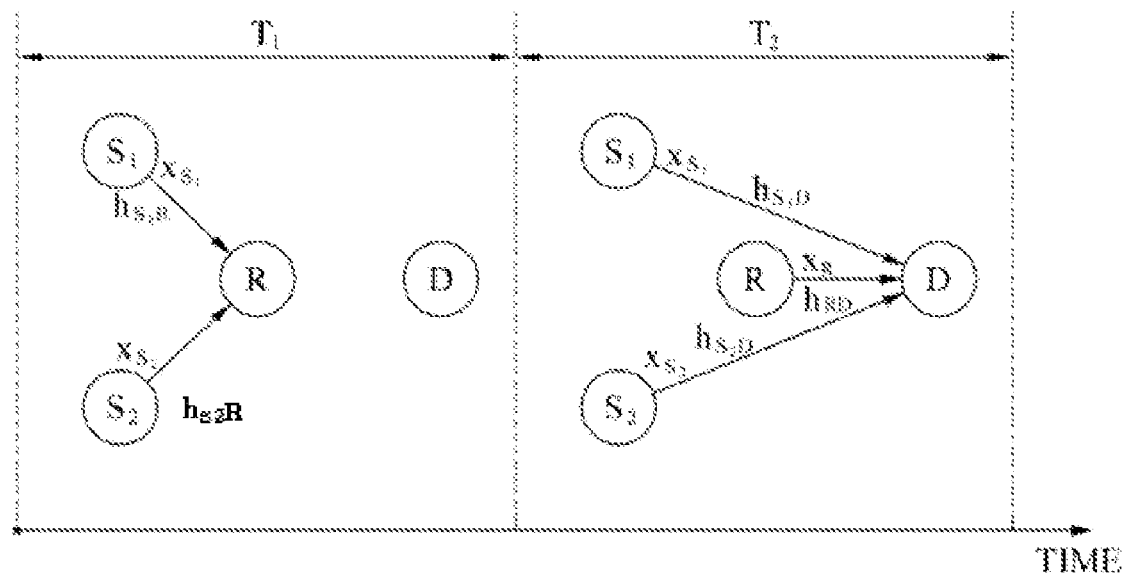
FIG. 1 is a diagram illustrating exemplary operations of a first source node, a second source node, a relay node, and a destination node in a first time slot and a second time slot.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures. The following detailed description is provided to assist the reader in gaining a comprehensive understanding of the methods and systems described herein. Accordingly, various changes, modifications, and equivalents of the systems and methods described herein will be suggested to those of ordinary skill in the art. Also, descriptions of well-known functions and constructions are omitted to increase clarity and conciseness.

FIG. 1 illustrates operations of a first source node, a second source node, a relay node, and a destination node in a first time slot and a second time slot.

Referring to FIG. 1, $S_1$ indicates a first source node, $S_2$ indicates a second source node, R indicates a relay node, and D indicates a destination node. In this exemplary embodiment, the first source node and the second source node may be mobile terminals, and the destination node may be a base station.

The first source node $S_1$ and the second source node $S_2$ transmit a first source signal $x_{S_1}$ and a second source signal $x_{S_2}$ to the relay node R in a first time slot T1. Here, a channel vector of a channel formed between the first source node S1 and the relay node R and a channel formed between the second source node S2 and the relay node R may be represented as $h_{S_1R}$ and $h_{S_2R}$.

The relay node R receives the first source signal $x_{S_1}$ and the second source signal $x_{S_2}$ for the first time slot T1. After a cyclic prefix of the first source signal $x_{S_1}$ and the second source signal $x_{S_2}$ is canceled, a received signal of the relay node R may be represented by, $$r_R = \sqrt{E_{S_1R}} H_{S_1R} x_{S_1} + \sqrt{E_{S_2R}} H_{S_2R} x_{S_2} + w_R \quad \text{[Equation 1]}$$

where $H_{S_1R}$ indicates a channel matrix of the channel formed between the first source node S1 and the relay node R, $H_{S_2R}$ indicates a channel matrix of the channel formed between the second source node S2 and the relay node R, $E_{S_1R}$ indicates effective energy in the relay node R with respect to the first source signal, $E_{S_2R}$ indicates effective energy in the relay node R with respect to the second source signal, $w_R$ indicates an additive White Gaussian Noise whose covariance matrix is $\sigma_w^2 I_N$, when $H_{AB}$ is N×N, an element existing in a $k^{th}$ row and an $l^{th}$ column of $H_{AB}$ is $[H_{AB}]_{k,l} = h_{AB}((k-1) \bmod N)$, (k−1) mod N indicates a remainder of (k−1) divided by N.

The relay node R generates a relay signal $x_R$ based on the received signal $r_R$ in a second time slot T2, and transmits the generated relay signal $x_R$ to the destination node D. Here, each of the first source node $S_1$ and the second source node $S_2$ transmits the first source signal $x_{S_1}$ and the second source signal $x_{S_2}$ to the destination node D in the second time slot T2. In this aspect, the relay signal $x_R$ cooperates with the first source signal $x_{S_1}$ and the second source signal $x_{S_2}$, and is a signal encoded by using a space frequency block code (SFBC) scheme. Here, channel vectors of channels formed between the relay node R, the first source node $S_1$, the second source node $S_2$, and the destination node D may be represented as $h_{RD}$, $h_{S_1D}$, and $h_{S_2D}$.

Therefore, according to an embodiment of the present invention, a high data-transmission rate may be achieved and performance of a frequency may be improved via the relay signal $x_R$ based on and/or cooperating with the first source signal $x_{S_1}$ and the second source signal $x_{S_2}$. Also, where the first source node $S_1$ and the second source node $S_2$ are mobile terminals, the high data-transmission rate may be achieved with a fewer number of antennas.

Figure 2:
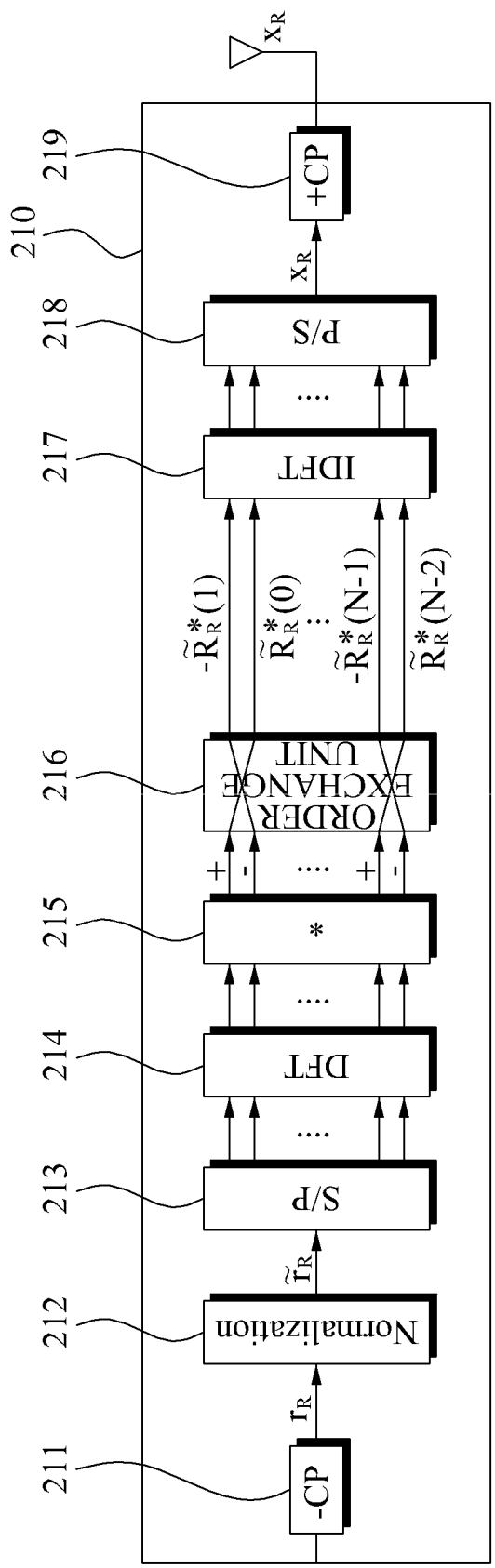
FIG. 2 is a diagram illustrating an exemplary system for generating a relay signal.

FIG. 2 illustrates a system for generating a relay signal.

Blocks 210 in FIG. 2 are shown to explain the features of the relay signal. With reference to FIG. 2, the blocks 210 include a cyclic prefix cancellation unit 211, an energy normalization unit 212, a serial to parallel converter 213, a discrete Fourier transformer (DFT) 214, a conjugate unit 215, an order exchange unit 216, an Inverse Discrete Fourier Transformer (IDFT) 217, a parallel to serial converter (P/S) 218, and a cyclic prefix adder 219. It is understood that the blocks 210 of FIG. 2 is provided as an illustration, and a system for generating a space frequency block code relay signal according to an embodiment of the present invention may not necessarily include part or all of the blocks 210 shown in FIG. 2.

Referring to FIG. 2, after a cyclic prefix of a first source signal $x_{S_1}$ and a second source signal $x_{S_2}$ transmitted from a first source terminal and a second source terminal is cancelled via the cyclic prefix cancellation unit 211, a received signal $r_R$ may be represented as shown in Equation 1.

Here, the received signal $r_R$ is normalized to a unity energy whose energy size is '1' via the energy normalization unit 212. The unit energy signal $\tilde{r}_R$ may be represented by $$\tilde{r}_R = \frac{r_R}{\sqrt{E_{S_1R} + E_{S_1R} + \sigma_w^2}} = \gamma_R r_R, \quad \text{[Equation 2]}$$

where a unit energy signal $\tilde{r}_R$ is separated via the serial to parallel converter 213 in a time domain, and is converted into a frequency domain received signal $\tilde{R}_R$ via the discrete Fourier transformer (DFT) 214.

A spectrum corresponding to an even numbered frequency component of the frequency domain received signal $\tilde{R}_R$ may be represented as $\tilde{R}_R(2l)$, and a spectrum corresponding to an odd numbered frequency component of the frequency domain received signal $\tilde{R}_R$ may be represented as $\tilde{R}_R(2l+1)$ In this case, l is a whole number ranging from zero to n/2−1.

The frequency domain received signal $\tilde{R}_R$ may encoded via the conjugate unit 215 and the order exchange unit 216 as below:

$$\begin{bmatrix} X_R(2l+1) \\ X_R(2l) \end{bmatrix} = \begin{bmatrix} -\tilde{R}_R^*(2l+1) \\ \tilde{R}_R^*(2l) \end{bmatrix}, \quad \text{[Equation 3]}$$

where l is a whole number ranging from zero to n/2−1.

Referring to Equation. 3, a relay signal in Equation 3 is encoded according to a space frequency block code (SFBC) scheme.

Referring again to FIG. 2, a relay signal $X_R$ in a frequency domain is converted into a signal in a time domain via the Inverse Discrete Fourier Transformer (IDFT) 217, and the converted signal in the time domain is integrated in the time domain via the parallel to serial converter (P/S) 218 so as to generate a relay signal $x_R$ in the time domain. A cyclic prefix is added to $x_R$ by the cyclic prefix adder 219.

Consequently, the relay signal $X_R$ in the frequency domain with respect to the finally generated relay signal $X_R$ may be represented by, $$\begin{aligned} x_R &= F^{-1}PS\{F\tilde{r}_R\}^* \\ &= \gamma_R\{\sqrt{E_{S_1R}}\,F^{-1}PS\{FH_{S_1R}x_1\}^* + \\ &\quad \sqrt{E_{S_2R}}\,F^{-1}PS\{FH_{S_2R}x_2\}^*\} + w_R' \\ w_R' &= \frac{\sqrt{2}\,F^{-1}PS\{Fw_R\}^*}{\sqrt{E_{S_1R}+E_{S_2R}+N_0}} \\ S &= I_{\frac{N}{2}\times\frac{N}{2}} \otimes \begin{bmatrix} 1 & 0 \\ 0 & -1 \end{bmatrix} \\ P &= I_{\frac{N}{2}\times\frac{N}{2}} \otimes \begin{bmatrix} 0 & 1 \\ 1 & 0 \end{bmatrix}, \end{aligned} \quad \text{[Equation 4]}$$

where F indicates a Fast Fourier Transform matrix, ⊗ and indicates a Kronecker product operator.

Here, the system for generating the space frequency block code relay signal of the present invention may generate the relay signal $x_R$ via operations in the time domain. Therefore, in Equation 4, the relay signal $x_R$ in the time domain is equivalent to the relay signal $X_R$ in the frequency domain, and may be generated via operations in the time domain, which will be described in detail by referring to FIG. 3.

Figure 3:
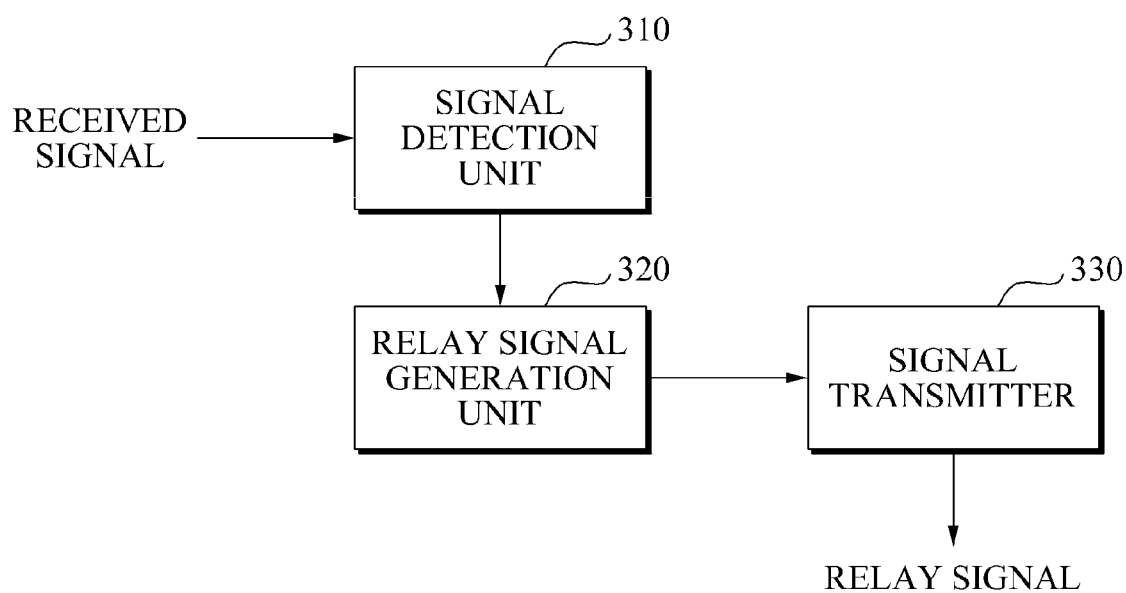
FIG. 3 is a block diagram illustrating still another exemplary system for generating a space frequency block code relay signal.

FIG. 3 illustrates a system for generating a space frequency block code relay signal according to an exemplary embodiment of the present invention.

Referring to FIG. 3, the system includes a signal detection unit 310, a relay signal generation unit 320, and a signal transmitter 330. The system of FIG. 3 is described with reference to embodiments described in relation to FIGS. 1 and 2.

The signal detection unit 310 detects a received signal $r_R$ by receiving a first source signal $x_{S_1}$ and a second source signal $x_{S_2}$ transmitted from a first source terminal and a second source terminal. The signal detection unit 310 may receive the first source signal $x_{S_1}$ and the second source signal $x_{S_2}$ in a first time slot.

Also, a first source node and a second source node may be scheduled according to various schemes. Specifically, the first source node and the second source node may transmit the first source signal $x_{S_1}$ and the second source signal $x_{S_2}$ using the same frequency band for both the first and second source nodes. The first and second source nodes may be scheduled using a frequency band whose channel is in good state. Here, a diversity gain may be obtained. Therefore, technical aspects of the present invention may be applied to a communication system adopting a Frequency Division Multiple Access (FDMA) scheme.

The relay signal generation unit 320 generates a relay signal $x_R$ based on the first source signal $x_{S_1}$ and the second source signal $x_{S_2}$ using a space frequency block code scheme. The relay signal $x_R$ is based on the received signal $r_R$.

Accordingly, even though the first source terminal, the second source terminal, and the relay node are separated, the first source terminal, the second source terminal, and the relay node cooperate with each other and substantially operate as a single transmitter, thereby achieving a transmission diversity effect. In addition, the number of antennas installed in the first source terminal and the second source terminal may be decreased.

The relay signal generation unit 320 may generate the relay signal $x_R$ by processing the received signal $r_R$ in a time domain. That is, since the relay signal generation unit 320 generates the relay signal $x_R$ by processing the received signal $r_R$ in the time domain, operation required to generate the relay signal $x_R$ may be simplified. As described in relation to FIG. 2, the relay signal $x_R$ may be easily generated since the operation of generating the relay signal $x_R$ is substituted with an operation in the time domain.

Accordingly, the relay signal generation unit 320 may calculate a conjugate signal of the received signal $r_R$ in the time domain, and generate the relay signal $x_R$ based on the conjugate signal.

Where a conjugate signal of $\tilde{R}_R$ is $\tilde{R}_R^*$ in a unit energy signal $\tilde{r}_R$ and in a unit energy signal $\tilde{R}_R$ in the frequency domain, a signal in a time domain corresponding to $\tilde{R}_R^*$ may be represented by, $$\tilde{r}_R(-n)_N = r_c(n) \quad \text{[Equation 5]}$$

where $(A)_N$ indicates a remainder of A divided by N.

That is, by using a symmetry property of the DFT, the signal in the time domain corresponding to $\tilde{R}_R^*$ may be represented as $\tilde{r}_R^*(-n)_N$. The subscript N, for example, $(A)_N$ indicates a remainder of A divided by N, and this is a modulo operation.

When both sides of Equation 5 are transformed according to the DFT, Equation 6 may be generated as below:

$$\tilde{R}_R^* = R_c = Wr_c \quad \text{[Equation 6]}$$

where W indicates a root of unity complex multiplicative constants.

Here, each of an odd numbered frequency component and an even numbered frequency component of $\tilde{R}_R^*$ may be calculated using $D_e$ and $D_o$ shown in Equation 7.

$$D_e = [1,0,1,0,1\ldots1,0,1,0]^T$$

$$D_o = [0,1,0,1\ldots0,1,0,1]^T \quad \text{[Equation 7]}$$

Specifically, when $D_e$ is multiplied by $\tilde{R}_R^*$ or $R_c$, the even numbered frequency component of $\tilde{R}_R^*$ or $R_c$ may be calculated, and when $D_o$ is multiplied by $\tilde{R}_R^*$ or $R_c$, the odd numbered frequency component of $\tilde{R}_R^*$ or $R_c$ may be calculated.

$$R_o(k) = R_c(k)D_o(k)$$

$$R_e(k) = R_c(k)D_e(k) \quad \text{[Equation 8]}$$

where k indicates a frequency index.

In Equation 8, since multiplication in the frequency domain may be substituted with a convolution operation in the time domain, Equation 8 may be also represented by, $$r_o(n) = r_C(n) *_N \delta_o(n)$$
$$r_e(n) = r_C(n) *_N \delta_e(n), \quad \text{[Equation 9]}$$

where $*_N$ indicates a circular convolution with respect to a length N.

Since and $\delta_e$ are $\delta_o$ zeros except in the case of n=0 or n=N/2, $r_e$ and $r_o$ may be represented by, $$r_o(n) = \frac{1}{2}r_c(n) + \frac{1}{2}r_c(n - N/2)_N \quad \text{[Equation 10]}$$
$$r_e(n) = \frac{1}{2}r_c(n) - \frac{1}{2}r_c(n - N/2)_N.$$

That is, complex operations in the frequency domain are not necessary to calculate the odd numbered frequency component $R_o(k)$ of $\tilde{R}_R^*$ or $R_c$ and the even numbered frequency component of $R_e(k)$ of $\tilde{R}_R^*$ or $R_c$, and, as shown in Equation 10, $r_o(n)$ and $r_e(n)$ corresponding to $R_o(k)$ and $R_e(k)$ may be calculated by performing a conjugation operation, a time shift operation, and a convolution operation with respect to $\tilde{r}_R$.

Therefore, the relay signal $x_R$ may be represented using a frequency shift property as below:

$$x_R(n) = \frac{1}{2}r_c(n)(W_N^{-n} - W_N^n) + \quad \text{[Equation 11]}$$
$$\frac{1}{2}r_c(n - N/2)_N (W_N^{-n} + W_N^n)$$
$$= r_c(n) \cdot j\sin(2\pi n/N) +$$
$$r_c(n - N/2)_N \cdot \cos(2\pi n/N).$$

Consequently, the relay signal generation unit 320 may generate the relay signal $x_R$ by performing a conjugation operation, a time shift operation, and a convolution operation in the time domain, without performing an operation in the frequency domain, as shown in Equation 11.

That is, the operation shown in Equation 4 generating the relay signal $X_R$ in the frequency domain may be substituted with the operation as shown in Equation 11 generating the relay signal $x_R$ in the time domain.

The signal transmitter 330 transmits the relay signal $x_R$ to a destination node. The signal transmitter 330 may transmit the relay signal to a destination node in a second time slot. Accordingly, the destination node may receive the relay signal $x_R$, the first source signal $x_{S_1}$, and the second source signal $x_{S_2}$ in the second time slot via a wireless channel, thereby increasing a data transmission rate.

Figure 4:
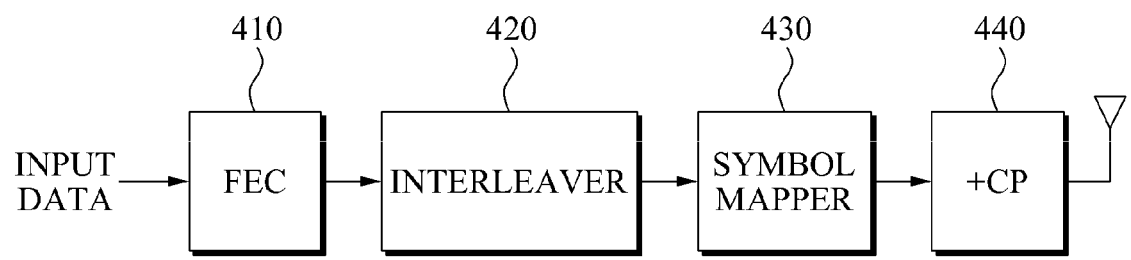
FIG. 4 is a diagram illustrating an exemplary system for generating a source signal.

FIG. 4 illustrates a system for generating a source signal such as a first source signal and a second source signal.

Referring to FIG. 4, input data is encoded via a forward error correction (FEC) unit 410.

The encoded data is inputted to an interleaver 420, and a burst error is transformed into a random error. The interleaver 420 may interleave in a different pattern for each source node.

Also, the interleaved input data may be mapped in various modulation methods via a symbol mapper 430, and a data symbol may be generated. Specifically, interleaved input data may be mapped into $2^M$-Phase Shift Keying (PSK) and $2^M$-Quadrature Amplitude Modulation (QAM) schemes.

Finally, a cyclic prefix is added to the mapped data by a cyclic prefix adder 440.

Figure 5:
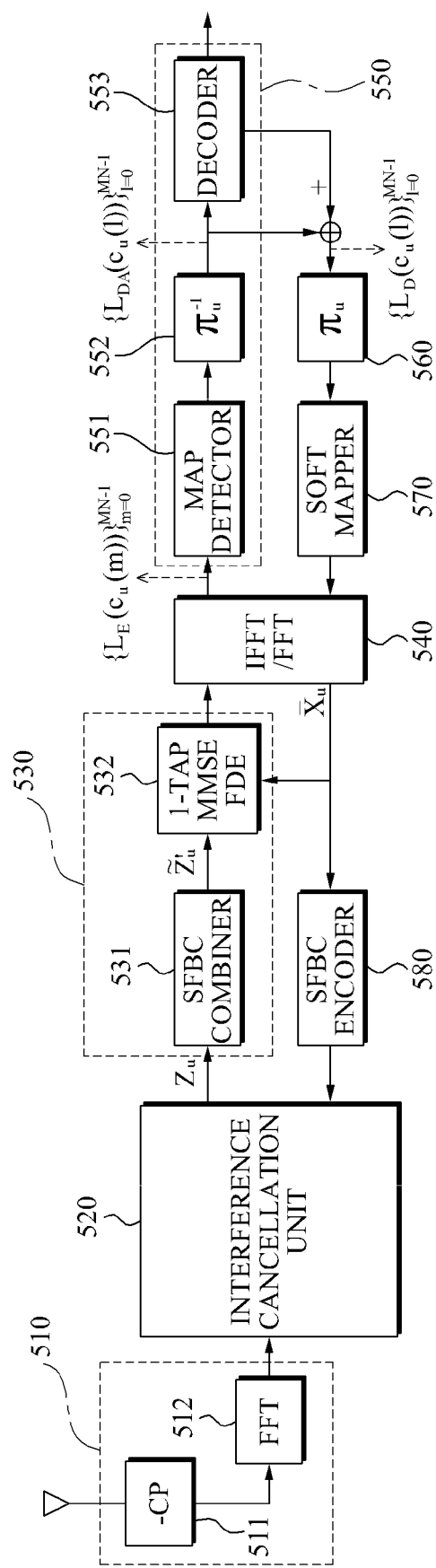
FIG. 5 is a block diagram illustrating an exemplary system for receiving a space frequency block code relay signal.

FIG. 5 illustrates a system for receiving a space frequency block code relay signal according to an exemplary embodiment of the present invention.

Referring to FIG. 5, the system includes a signal detection unit 510, an interference cancellation unit 520, a frequency domain equalizer (FDE) 530, a Fast Fourier Transformer (FFT)/Inverse Fast Fourier Transformer (IFFT) 540, a decoding unit 550, an interleaver 560, a soft mapper 570, and a space frequency block code (SFBC) encoder 580.

The signal detection unit 510 receives a first source signal $x_{S_1}$ and second source signal $x_{S_2}$ transmitted from a first and second source nodes and a relay signal $x_R$ transmitted from a relay node, and detects a received signal in a frequency domain.

A received signal $r_D$ in a time domain, having a cyclic prefix cancelled via a prefix cancellation unit 511, is transformed into a received signal in a frequency domain via a Fast Fourier Transformer 512. In this instance, the received signal $r_D$ in the time domain may be represented using Equation 12, $$r_D = \sqrt{E_{S_1R}} H_{S_1D} x_1 + \sqrt{E_{S_2D}} H_{S_2D} x_2 + \quad \text{[Equation 12]}$$
$$\sqrt{E_{RD}} H_{RD} x_R + w_D$$
$$= \sqrt{E_{S_1R}} H_{S_1D} x_1 +$$
$$\gamma_R \sqrt{E_{RD} E_{S_1R}} H_{RD} F^{-1} PS\{FH_{S_1R} x_1\}^* +$$
$$\sqrt{E_{S_2D}} H_{S_2D} x_2 +$$
$$\gamma_R \sqrt{E_{RD} E_{S_2R}} H_{RD} F^{-1} PS\{FH_{S_2R} x_2\}^* +$$
$$\sqrt{E_{RD}} H_{RD} w'_R + w_D,$$

where $W_D$ indicates is a complex additive White Gaussian Noise whose average is zero, and dispersion is $\sigma_w^2$.

Here, a portion of the second row and the fourth row in Equation 12 may be represented by, $$H_{RD} F^{-1} PS\{FH_{S_uR} x_u\}^* = F^{-1} \Lambda_{RD} PS \Lambda_{S_uR}^* \{Fx_u\}^* \quad \text{[Equation 13]}$$
$$= F^{-1} \Lambda_{RD} P \Lambda_{S_uR}^* S\{Fx_u\}^*$$
$$\cong F^{-1} \Lambda_{RD} \Lambda_{S_uR}^* PS\{Fx_u\}^*$$
$$\Lambda_{S_uR} = FH_{S_uR} F^{-1}$$
$$\Lambda_{RD} = FH_{RD} F^{-1}.$$

where u indicates an index of a first source terminal and a second source terminal, and is 1 or 2.

In Equation 13, frequency responses between adjacent sub channels are almost the same with each other.

The $r_D^1$ which is a normalized $r_D$ of Equation 12 may be represented by, $$r'_D = \gamma_{S_1D} H_{S_1D} x_1 + \quad \text{[Equation 14]}$$
$$\gamma_{S_2D} H_{S_2D} x_2 + \gamma_{S_1RD} F^{-1} \Lambda_{S_1RD} PS\{Fx_1\}^* +$$
$$\gamma_{S_2RD} F^{-1} \Lambda_{S_2RD} PS\{Fx_2\}^* + w$$
$$\gamma_{S_uD} = \eta \sqrt{E_{S_uD}(E_{S_1R} + E_{S_2R} + \sigma_w^2)}$$
$$\gamma_{S_uRD} = \eta \sqrt{2E_{S_uR} E_{RD}}$$

-continued
$$w = \eta\sqrt{E_{S_1R} + E_{S_2R} + \sigma_w^2}\left(w_D + \sqrt{E_{RD}}\, H_{RD} w'_R\right)$$

$$\eta = \sqrt{\frac{1}{E_{S_1R} + E_{S_2R} + \sigma_w^2 + 2E_{RD}\sum_{l=0}^{L_{RD}} |h_{RD}(l)|^2}},$$

where $L_{AB}$ indicates a channel memory length of a channel formed between an A node and a B node, and is related to an time length of a channel impulse response.

The $r_D^1$ is transformed into a received signal $R_D^1$ in the frequency domain via the FFT 512. $R_D^1$ may be represented by, $$R'_D = \gamma_{S_1D}\Lambda_{S_1D}X_1 + \gamma_{S_2D}\Lambda_{S_2D}X_2 + \quad \text{[Equation 15]}$$
$$\gamma_{S_1RD}\Lambda_{S_1RD}PSX_1^* + \gamma_{S_2RD}\Lambda_{S_2RD}PSX_2^* + W.$$

Accordingly, the signal detection unit 510 may detect $R_D^1$.

Also, the interference cancellation unit 520 cancels an interference signal occurring due to another source node in the received signal for each of the first and second source nodes, and generates first and second interference cancellation source signals.

With respect to $R_D^1$, where a first interference cancellation source signal generated by cancellation of an interference signal occurring due to a second source terminal for the first source terminal is $Z_1$, and a second interference cancellation source signal generated by cancellation of an interference signal occurring due to a first source terminal for the second source terminal is $Z_2$, $Z_1$ and $Z_2$ may be represented by, $$Z_1 = \gamma_{S_1D}\Lambda_{S_1D}X_1 + \gamma_{S_1RD}\Lambda_{S_1RD}PSX_1^* + \quad \text{[Equation 16]}$$
$$\gamma_{S_2D}\Lambda_{S_2D}(X_2 - \overline{X}_2) + \gamma_{S_2RD}\Lambda_{S_2RD}PS(X_2^* - \overline{X}_2^*) + W$$
$$Z_2 = \gamma_{S_1D}\Lambda_{S_1D}(X_1 - \overline{X}_1) + \gamma_{S_1RD}\Lambda_{S_1RD}PS(X_1^* - \overline{X}_1^*) +$$
$$\gamma_{S_2D}\Lambda_{S_2D}X_2 + \gamma_{S_2RD}\Lambda_{S_2RD}PSX_2^* + W,$$

where $\overline{X}_u$ indicates an average vector with respect to the decoded $u^{th}$ source signal in the frequency domain.

That is, referring to Equation 16, the interference cancellation unit 520 repeatedly cancels the interference signal in $R_D^1$, and generates the first interference cancellation source signal corresponding to the first source signal and the second interference cancellation source signal corresponding to the second source signal. In particular, as a number of the repeated cancellation by the interference cancellation unit 520 is increased, the first and second interference source signals whose interference is nearly canceled in $R_D^1$ may be obtained.

Also, the frequency domain equalizer (FDE) 530, including an SBFC combiner 531 and an 1-tap MMSE FDE (Minimum Mean Square Error Frequency Domain Equalizer) 532, generates a first compensation source signal corresponding to the first source signal and a second compensation source signal corresponding to the second source signal by compensating for the first and second interference cancellation source signals.

That is, $Z_u(Z_1, Z_2)$ is inputted to the an SBFC combiner 531. With regard to $Z_1$, after a complex conjugate is performed with respect to $Z_1$, Equation 17 in a matrix type may be calculated.

$$Z'_{1,k} = \begin{bmatrix} Z'_1(2k) \\ Z_1^{*\prime}(2k+1) \end{bmatrix} \quad \text{[Equation 17]}$$
$$= \begin{bmatrix} \Lambda'_{S_1D}(2k) & -\Lambda'_{S_1RD}(2k) \\ \Lambda'^*_{S_1RD}(2k) & \Lambda'^*_{S_1D}(2k) \end{bmatrix}\begin{bmatrix} X_1(2k) \\ X_1^*(2k+1) \end{bmatrix} +$$
$$\begin{bmatrix} \Lambda'_{S_2D}(2k) & -\Lambda'_{S_2RD}(2k) \\ \Lambda'^*_{S_2RD}(2k) & \Lambda'^*_{S_2D}(2k) \end{bmatrix}$$
$$\begin{bmatrix} X_2(2k) - \overline{X}_2(2k) \\ X_2^*(2k+1) - \overline{X}_2^*(2k+1) \end{bmatrix} +$$
$$\begin{bmatrix} W(2k) \\ W^*(2k+1) \end{bmatrix}$$
$$\equiv \Lambda_{1,k} X'_{1,k} + \Lambda_{2,k} X'_{2,k} + W'$$

$$\Lambda'_{S_uD}(2k) = \gamma_{S_uD}\Lambda_{S_uD}(2k)$$
$$\Lambda'_{S_uRD}(2k) = \gamma_{S_uRD}\Lambda_{S_uRD}(2k),$$

After $Z_1$ is SFBC combined, the signal may be represented by, $$\tilde{Z}'_{1,k} = \begin{bmatrix} \tilde{Z}'_1(2k) \\ \tilde{Z}'_1(2k+1) \end{bmatrix} = \Lambda^H_{1,k} Z'_{1,k} \quad \text{[Equation 18]}$$
$$= \begin{bmatrix} \tilde{\Lambda}_1(2k) & 0 \\ 0 & \tilde{\Lambda}_1(2k) \end{bmatrix}\begin{bmatrix} X_1(2k) \\ X_1^*(2k+1) \end{bmatrix} +$$
$$\begin{bmatrix} \tilde{A}_2(2k) & -\tilde{B}_2(2k) \\ \tilde{C}_2(2k) & \tilde{D}_2(2k) \end{bmatrix}$$
$$\begin{bmatrix} X_2(2k) - \overline{X}_2(2k) \\ X_2^*(2k+1) - \overline{X}_2^*(2k+1) \end{bmatrix} +$$
$$\Lambda^H_{1,k}\begin{bmatrix} W(2k) \\ W^*(2k+1) \end{bmatrix}$$

$$\tilde{\Lambda}_1(2k) = |\Lambda'_{S_1D}(2k)|^2 + |\Lambda'_{S_1RD}(2k)|^2$$
$$\tilde{A}_2(2k) =$$
$$\Lambda'_{S_1D}(2k)\Lambda'_{S_2D}(2k) + \Lambda'^*_{S_1RD}(2k)\Lambda'^*_{S_2RD}(2k) = \tilde{D}_2(2k)$$
$$\tilde{B}_2(2k) = -\Lambda'^*_{S_1D}(2k)\Lambda'^*_{S_2RD}(2k) + \Lambda'_{S_1RD}(2k)\Lambda'^*_{S_2D}(2k) =$$
$$-\tilde{C}_2(2k)$$

Referring to Equation $\tilde{Z}_1'(2k)$ and $\tilde{Z}_1'(2k+1)$ may be represented by, $$\tilde{Z}'_1(2k) = \tilde{\Lambda}_1(2k)X_1(2k) + \tilde{A}_2(2k)(X_2(2k) - \overline{X}_2(2k)) + \quad \text{[Equation 19]}$$
$$\tilde{B}_2(2k)(X_2^*(2k+1) - \overline{X}_2^*(2k+1)) +$$
$$\Lambda'^*_{S_1D}(2k)W(2k) + \Lambda'_{S_1RD}(2k)W^*(2k+1)$$
$$\tilde{Z}'_1(2k+1) = \tilde{\Lambda}_1(2k)X_1^*(2k+1) -$$
$$\tilde{B}_2(2k)(X_2(2k) - \overline{X}_2(2k)) +$$
$$\tilde{A}_2(2k)(X_2^*(2k+1) - \overline{X}_2^*(2k+1)) -$$
$$\Lambda'^*_{S_1RD}(2k)W(2k) + \Lambda'_{S_1D}(2k)W^*(2k+1)$$

Also, the 1-tap MMSE FDE 532 may compensate $\tilde{Z}_1'(2k)$ and $\tilde{Z}_1'(2k+1)$ using an equalization coefficient shown in Equation 20.

$$G_1(2k) = G_1(2k+1) \quad \text{[Equation 20]}$$
$$= \frac{\tilde{A}_1(2k)}{v_1|\tilde{A}_1(2k)|^2 + v_2|\tilde{A}_2(2k)|^2 + v_2|\tilde{B}_2(2k)|^2 + \sigma_w^2 \tilde{A}_1(2k)}$$
$$v_u = \frac{1}{N}\text{trace}(V_u),$$

where trace (X) indicates a set of diagonal elements of X, and $$V_u = \text{covariance}(x_u, x_u)$$
$$= \text{Diagonal}(v_{u,0}, v_{u,1}, \ldots, v_{u,N-1}).$$

Consequently, the first compensation source signal which is generated after the first interference cancellation source signal passes through the SBFC combiner 531 and the 1-tap MMSE FDE 532 may be represented by, $$\bar{X}_1(2k) = G_1^*(2k)\tilde{Z}_1'(2k) + (\mu_1 - G_1^*(2k)\tilde{A}_1(2k))\bar{X}_1(2k) \quad \text{[Equation 21]}$$
$$\bar{X}_1^*(2k+1) = G_1^*(2k+1)\tilde{Z}_1'(2k+1) +$$
$$(\mu_1 - G_1^*(2k+1)\tilde{A}_1(2k+1))\bar{X}_1^*(2k+1)$$
$$\mu_1 = \frac{1}{N}\sum_{k=0}^{N-1}(G_1^*(k)\tilde{A}_1(k))$$
$$\sigma_1^2 = \mu_1 - v_1\mu_1^2,$$

where $\mu_1$ indicates an average with respect to an estimate of the first source signal in a time domain, and $\sigma_1$ indicates dispersion with respect to an estimate of the first source signal in a time domain.

Since an average and dispersion with respect to the second compensation source signal in the time domain may be generated via the above described algorithm, descriptions regarding generation of the second compensation source signal are omitted.

The first compensation source signal and the second compensation source signal generated via the frequency domain equalizer 530 are transformed into signals in the time domain via the FFT/IFFT 540.

Also, the first compensation source signal and the second compensation source signal which are transformed into signals in the time domain are decoded via the decoding unit 550.

Here, extrinsic log likelihood ratios (LLRs) may be generated using Equation 22, as below:

$$L_E(c_u(2n)) = \frac{2\sqrt{2}\,\text{Re}\{\hat{x}(n)\}\mu_u}{\sigma_u^2} \quad \text{[Equation 22]}$$
$$L_E(c_u(2n+1)) = \frac{2\sqrt{2}\,\text{Im}\{\hat{x}(n)\}\mu_u}{\sigma_u^2}.$$

Also, a first estimation source signal corresponding to the first source signal and a second estimation source signal corresponding to the second source signal are generated via the decoder 553. The first and second estimation source signals are decoded first and second source signals in the time domain, the signals of which interference is cancelled.

A maximum a posteriori (MAP) detector 551 decides on the first and second compensation source signals which have been transformed into signals in the time domain.

Also, an inverse interleaver 552 reconstructs interleaved signals using a pattern respectively corresponding to the first and second source signals.

After passing through the inverse interleaver 552, a priori LLR with respect to the reconstructed signals may be represented by Equation 22, as below:

$$\{L_{DA}(c_u(l))\}_{l=0}^{MN-1} = \pi_u^{-1}(\{L_E(c_u(2m))\}_{m=0}^{MN-1}). \quad \text{[Equation 23]}$$

The decoder 553 calculates extrinsic information with respect to coded data and decoded data using a priori LLR, and feeds back the calculated extrinsic information to the interference cancellation unit 520 and the 1-tap MMSE FDE 532. The extrinsic information may be used as priori information in the interference cancellation unit 520 and the 1-tap MMSE FDE 532.

The decoder 553 generates a first estimation source signal, a decoded first compensation source signal, corresponding to the first source signal, and a second estimation source signal, a decoded second compensation source signal, corresponding to the second source signal.

The first and second estimation source signals are re-interleaved via the interleaver 560. Also, the interleaved first and second estimation source signals are re-mapped into data symbols via a soft mapper 570. Here, the interleaver 560 may use the same interleaving pattern as the first source terminal and the second source terminal, and the soft mapper 570 may use the same mapping method as the first source terminal and the second source terminal.

Accordingly, after the first and second estimation source signals are interleaved, signals generated by being mapped into data symbols are encoded via the SFBC encoder 580. The encoded signals are fed back to the interference cancellation unit 520, and the interference cancellation unit 520 updates the first and second interference cancellation signals using the fed back signals.

As described above, the interference cancellation unit 520 repeatedly cancels interference, the frequency domain equalizer 530 performs equalization, and the decoding unit 550 repeatedly performs decoding, thereby acquiring the first and second estimation source signals which are nearly the same as the first and second source signals.

Figure 6:
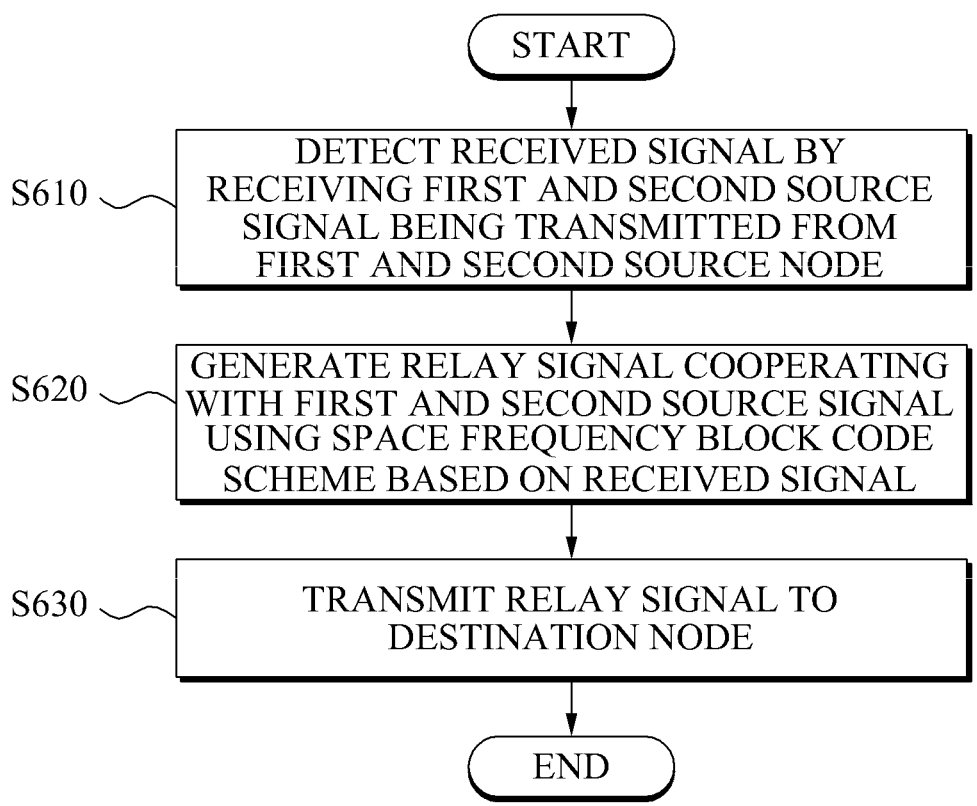
FIG. 6 is a flowchart illustrating an exemplary method of generating a space frequency block code relay signal.

FIG. 6 is a flowchart illustrating a method of generating a space frequency block code relay signal according to an exemplary embodiment of the present invention.

With reference to FIG. 6, the method comprises detecting a received signal by receiving a first and second source signals being transmitted from a first and second source nodes, in operation S610, and generating a relay signal according to the received signal based on the first and second source signals and a space frequency block code (SFBC) scheme, in operation S620.

According to one aspect of the present invention, in operation S620, the replay signal may be generated by processing the received signal in a time domain.

According to another aspect, in operation S620, a conjugate signal of the received signal in the time domain may be calculated, and the relay signal may be generated based on the conjugate signal of the received signal.

According to still another aspect, in operation S620, the relay signal may be generated by performing a conjugation operation, a time shift operation, and a convolution operation with respect to the received signal in the time domain.

The method may further comprise transmitting the relay signal to a destination node in operation S630.

Figure 7:
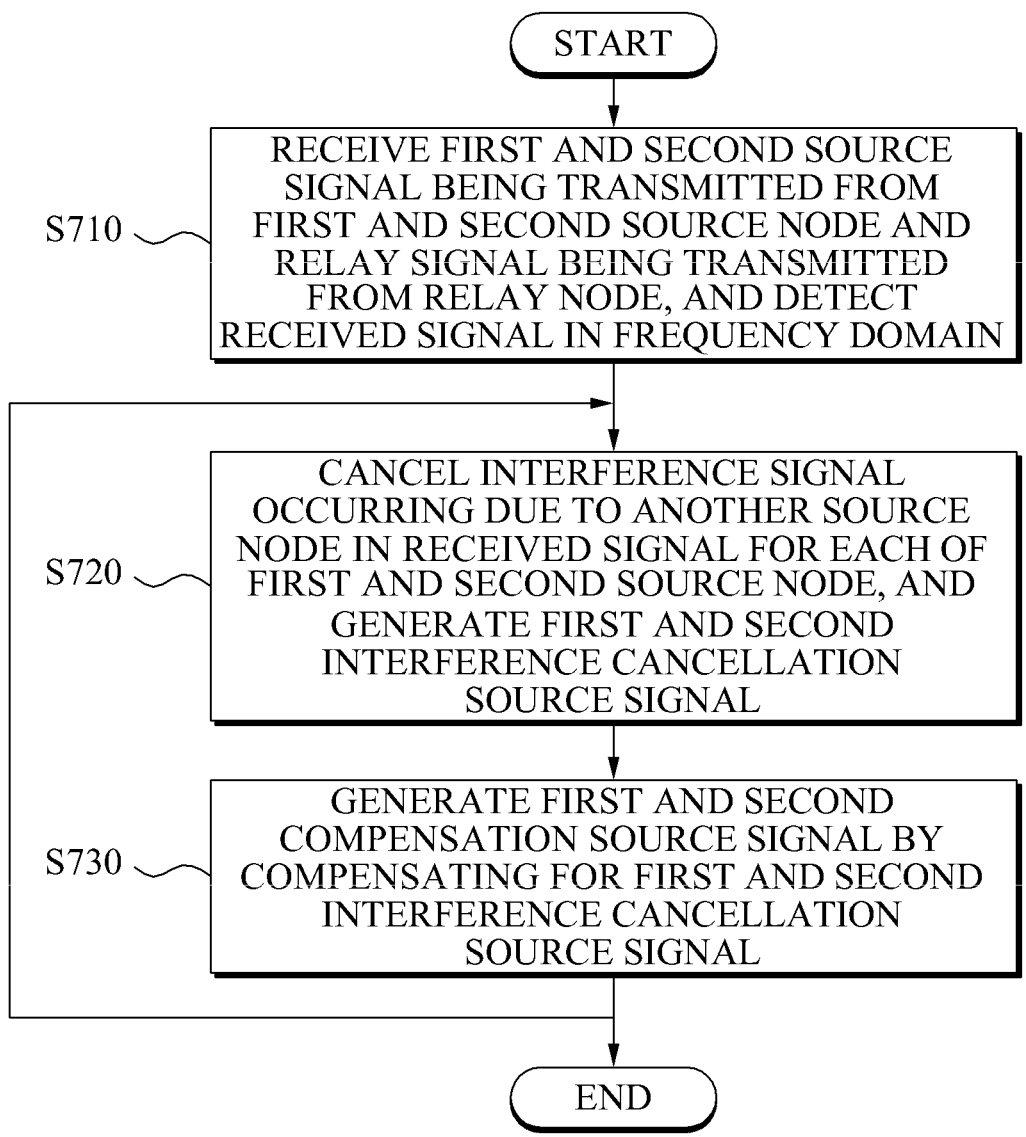
FIG. 7 is a flowchart illustrating an exemplary method of receiving a space frequency block code relay signal.

FIG. 7 is a flowchart illustrating a method of receiving a space frequency block code relay signal according to an exemplary embodiment of the present invention.

With reference to FIG. 7, the method comprises, receiving first and second source signals being transmitted from first and second source nodes and a relay signal being transmitted from a relay node, and detecting a received signal in a frequency domain, in operation S710, canceling an interference signal occurring due to another source node in the received signal for each of the first and second source nodes, and generating first and second interference cancellation source signals, in operation S720, and generating a first and second compensation source signals by compensating for the first and second interference cancellation source signals, in operation S730.

According to one aspect of the present invention, the operation S720 of generating the first and second interference cancellation source signals may update the first and second interference cancellation source signals by canceling the interference due to the other source node utilizing the first and second compensation source signals.

According to another aspect, the operation S730 of generating the first and second compensation source signals may generate the first and second compensation source signals according to an equalization coefficient which is generated based on a channel state of channels formed between the first node, the second node, the relay node, and a base station.

According to still another aspect, the operation S730 of generating the first and second compensation source signals may generate the first and second compensation source signals based on the equalization coefficient which is generated according to a minimum mean square error (MMSE) scheme.

Since some of the descriptions relating to FIGS. 1 through 5 may be applicable to FIGS. 6 and 7, those descriptions for FIGS. 6 and 7 will be omitted for conciseness.

The method of generating and receiving a space frequency block code relay signal according to the above-described exemplary embodiments may be recorded, stored, or fixed in one or more computer-readable media that include program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVD; magneto-optical media, such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus configured to generate a space frequency block code (SFBC) relay signal, the apparatus comprising:
    a signal detection unit configured to detect a received signal by receiving first and second source signals transmitted from first and second source nodes in a first time slot;
    a relay signal generation unit configured to generate a relay signal to be equal to a sum of a result of a conjugation operation on the received signal in a time domain, and a result of a time shift operation and a convolution operation on the received signal in the time domain, the relay signal cooperating with the first and second source signals and being encoded using a SFBC scheme; and
    a signal transmitter configured to transmit the relay signal to a destination node in a second time slot,
    wherein the first and second source nodes are mobile terminals and the destination node is a base station, and
    wherein the destination node receives the relay signal from the signal transmitter, the first source signal from the first source node, and the second source signal from the second source node in the second time slot.

2. The apparatus of claim 1, wherein the relay signal generation unit is configured to calculate a conjugate signal of the received signal in the time domain, and generate the relay signal based on the conjugate signal of the received signal.

3. The apparatus of claim 1, wherein the signal detection unit is configured to detect the received signal by receiving the first and second source signals transmitted using the same frequency band for both the first and second source nodes.

4. An apparatus configured to receive a space frequency block code (SFBC) relay signal, the apparatus comprising:
    a signal detection unit configured to receive first and second source signals transmitted from first and second source nodes and a relay signal transmitted from a relay node in the same time slot, and detect a received signal in a frequency domain based on the received first and second source signals and the received relay signal, the relay signal being encoded using a SFBC scheme based on the first and second source signals;
    an interference cancellation unit configured to generate first and second interference cancellation source signals by canceling an interference signal due to another source node in the received signal for each of the first and second source nodes; and
    a frequency domain equalizer (FDE) configured to generate first and second compensation source signals by multiplying an equalization coefficient to each of the first and second interference cancellation source signals that is SFBC combined, the equalization coefficient being generated based on a channel state of channels formed between the first source node, the second source node, the relay node, and a base station,
    wherein the relay signal cooperates with the first and second source signals, and wherein the first and second source nodes are mobile terminals.

5. The apparatus of claim 4, wherein the FDE is configured to generate the first and second compensation source signals based on the equalization coefficient generated according to a minimum mean square error (MMSE) scheme.

6. The apparatus of claim 4, further comprising:
a decoder unit configured to convert the first and second compensation source signals to signals in a time domain, and generate first and second estimation source signals by decoding the first and second compensation source signals in the time domain,
wherein the interference cancellation unit is configured to update the first and second interference cancellation source signals based on the first and second estimation source signals.

7. The apparatus of claim 4, wherein the signal detection unit is configured to receive the first and second source signals transmitted from the first and second source nodes, using the same frequency band for both the first and second source nodes.

8. A method of generating a space frequency block code (SFBC) relay signal, the method comprising:
receiving first and second source signals transmitted from first and second source nodes so as to detect a received signal in a first time slot;
generating a relay signal to be equal to a sum of a result of a conjugation operation on the received signal in a time domain, and a result of a time shift operation and a convolution operation on the received signal in the time domain, the relay signal cooperating with the first and second source signals and being encoded using a SFBC scheme; and
transmitting the relay signal to a destination node in a second time slot,
wherein the first and second source nodes are mobile terminals and the destination node is a base station, and
wherein the destination node receives the relay signal, the first source signal from the first source node, and the second source signal from the second source node in the second time slot.

9. The method of claim 8, wherein the generating of the relay signal comprises generating the relay signal based on a conjugate signal of the received signal in the time domain.

10. A method of receiving a space frequency block code (SFBC) relay signal, the method comprising:
receiving first and second source signals transmitted from first and second source nodes and a relay signal transmitted from a relay node in the same time slot;
detecting a received signal in a frequency domain based on the received first and second source signals and the received relay signal, the relay signal being encoded using a SFBC scheme based on the first and second source signals;
generating first and second interference cancellation source signals by canceling an interference signal due to another source node in the received signal for each of the first and second source nodes; and
generating first and second compensation source signals by multiplying an equalization coefficient to each of the first and second interference cancellation source signals that is SFBC combined, the equalization coefficient being generated based on a channel state of channels formed between the first source node, the second source node, the relay node, and a base station,
wherein the first and second source nodes are mobile terminals.

11. The method of claim 10, wherein the generating of the first and second compensation source signals comprises generating the first and second compensation source signals based on the equalization coefficient generated according to a minimum mean square error (MMSE) scheme.

12. At least one non-transitory computer-readable storage medium storing instructions for implementing the method of claim 8.

13. The apparatus of claim 1, wherein the apparatus is operative in a communication system adopting a frequency division multiple access (FDMA) scheme.

14. The apparatus of claim 1, wherein the first and second source signals are data encoded by a forward error correction (FEC) unit, interleaved by an interleaver, mapped by a symbol mapper, and provided with a cyclic prefix by a cyclic prefix adder.

15. The apparatus of claim 4, wherein the interference cancellation unit is configured to update the first and second interference cancellation source signals by canceling the interference due to the other source node by utilizing the first and second compensation source signals.

16. The apparatus of claim 4, further comprising:
a fast Fourier transformer (FFT)-inverse fast Fourier transformer (IFFT) configured to transform the first and second compensation source signals into signals in a time domain;
a decoding unit configured to decode the signals in the time domain,
wherein the decoding unit comprises
a maximum a posteriori (MAP) detector configured to decide on the first and second compensation source signals transformed into the time domain,
an inverse interleaver configured to reconstruct interleaved signals, using a pattern respectively corresponding to the first and second source signals, and
a decoder configured to generate first and second estimation source signals corresponding to the first and second source signals;
an interleaver configured to re-interleave the first and second estimation source signals;
a soft mapper configured to re-map the interleaved first and second estimation source signals into data symbols; and
a SFBC encoder configured to encode signals generated by being mapped into the data symbols.

17. The apparatus of claim 16, wherein the interference cancellation unit is configured to update the first and second interference cancellation signals, using the encoded signals from the SFBC encoder.

18. The method of claim 10, wherein the cancelling of the interference signal comprises updating the first and second interference cancellation source signals by cancelling the interference signal by utilizing the first and second compensation source signals.

19. The method of claim 18, further comprising:
converting the first and second compensation source signals to signals in a time domain; and
generating first and second estimation source signals by decoding the first and second compensation source signals in the time domain,
wherein the updating of the first and second interference cancellation source signals comprises updating of the first and second interference cancellation source signals based on the first and second estimation source signals.

20. At least one non-transitory computer-readable storage medium storing instructions for implementing the method of claim 10.

21. An apparatus configured to generate a space frequency block code (SFBC) relay signal, the apparatus comprising:
- a cyclic prefix cancellation unit configured to cancel a cyclic prefix of first and second source signals;
- an energy normalization unit configured to normalize a received signal corresponding to the first and second source signals;
- a serial to parallel converter configured to separate the received signal normalized to a unit energy signal, in a time domain;
- a discrete Fourier transformer (DFT) configured to convert the separated unit energy signal into a frequency domain received signal;
- an encoding unit comprising a conjugate unit and an order exchange unit, which are configured to encode the frequency domain received signal;
- an inverse discrete Fourier transformer (IDFT) configured to convert a relay signal in a frequency domain into a signal in a time domain;
- a parallel to serial converter configured to integrate the converted signal in the time domain to generate a relay signal in the time domain; and
- a cyclic prefix adder configured to add a cyclic prefix to the relay signal in the time domain,
- wherein the relay signal is an encoded signal based on the first and second source signals using a SFBC scheme.

* * * * *